(12) United States Patent
White, Jr.

(10) Patent No.: US 8,261,871 B2
(45) Date of Patent: *Sep. 11, 2012

(54) HYDRAULIC TRANSMISSION ASSEMBLY

(75) Inventor: Hollis N. White, Jr., Hopkinsville, KY (US)

(73) Assignee: White Drive Products, Inc., Hopkinsville, KY (US)

( * ) Notice: Subject to any disclaimer, the term of this patent is extended or adjusted under 35 U.S.C. 154(b) by 939 days.

This patent is subject to a terminal disclaimer.

(21) Appl. No.: 12/199,835

(22) Filed: Aug. 28, 2008

(65) Prior Publication Data

US 2008/0307784 A1    Dec. 18, 2008

Related U.S. Application Data

(63) Continuation of application No. 11/539,299, filed on Oct. 6, 2006, now Pat. No. 7,431,124.

(51) Int. Cl.
*B60K 7/00* (2006.01)

(52) U.S. Cl. ...................................................... 180/308

(58) Field of Classification Search ........... 180/305–308
See application file for complete search history.

(56) References Cited

U.S. PATENT DOCUMENTS

| | | | |
|---|---|---|---|
| 2,337,499 A | 12/1943 | Roth | |
| 2,583,704 A | 1/1952 | Howard et al. | |
| 3,430,438 A | 3/1969 | Weiss | |
| 3,653,454 A | 4/1972 | Nielsen | |
| 3,726,356 A | 4/1973 | Goff et al. | |
| 3,770,085 A | 11/1973 | Cottingham | |
| 3,913,454 A | 10/1975 | Nelson | |
| 4,253,807 A | 3/1981 | Pahl | |
| 4,291,779 A * | 9/1981 | Mann et al. | 180/305 |
| 4,492,539 A | 1/1985 | Specht | |
| 4,616,478 A | 10/1986 | Jensen | |
| 4,777,866 A * | 10/1988 | Tan | 91/488 |
| 4,845,949 A | 7/1989 | Shivvers et al. | |

(Continued)

FOREIGN PATENT DOCUMENTS

WO    WO 2004/041609 A2    5/2004

OTHER PUBLICATIONS

Supplemental European Search Report of EP 07 84 3914 dated Jul. 23, 2010.

(Continued)

*Primary Examiner* — Katy M Ebner
(74) *Attorney, Agent, or Firm* — Rankin, Hill & Clark LLP

(57) ABSTRACT

The present disclosure relates to a hydraulic transmission assembly for a ground vehicle comprises a pump unit and a hydraulic motor assembly connected to the pump unit. The pump unit includes a driven shaft configured to operably connect to a motor of the ground vehicle. The hydraulic motor assembly includes a motor housing configured to rotatably mount to a wheel assembly of the ground vehicle. The housing has a central opening. A stationary output shaft has a first end section received in the central opening and a second end section configured to rigidly attach to a frame of the ground vehicle. The output shaft includes at least one internal fluid passage in fluid communication with at least one fluid passage of the pump unit. Pressurization of the hydraulic motor assembly via the pump unit rotates the motor housing relative to the stationary output shaft which, in turn, rotates the wheel assembly in one of a first direction and second direction.

20 Claims, 7 Drawing Sheets

U.S. PATENT DOCUMENTS

| | | |
|---|---|---|
| 4,893,524 A | 1/1990 | Chashi et al. |
| 4,903,792 A * | 2/1990 | Ze-ying ............... 180/308 |
| 5,101,925 A | 4/1992 | Walker |
| 5,114,324 A * | 5/1992 | Spindeldreher ......... 418/61.3 |
| 5,531,071 A | 7/1996 | Asano |
| 6,006,149 A | 12/1999 | Salecker et al. |
| 6,145,635 A | 11/2000 | White |
| 6,248,037 B1 * | 6/2001 | Forster ............... 475/83 |
| 6,321,863 B1 | 11/2001 | Vanjani |
| 6,358,174 B1 | 3/2002 | Folsom et al. |
| 6,422,109 B1 | 7/2002 | Jolliff et al. |
| 6,530,211 B2 | 3/2003 | Holtzapple et al. |
| 6,772,591 B2 | 8/2004 | Ohashi et al. |
| 6,884,195 B2 | 4/2005 | Thoma et al. |
| 6,895,748 B2 | 5/2005 | Williams et al. |
| 7,017,446 B1 | 3/2006 | Okada et al. |
| 7,100,723 B2 * | 9/2006 | Roethler et al. ......... 180/165 |
| 7,143,858 B2 | 12/2006 | Hasegawa et al. |
| 7,363,759 B2 | 4/2008 | Ohashi et al. |

OTHER PUBLICATIONS

Office Action of CN 200780036289.0 dated Dec. 3, 2010.
Supplementary European Search Report of EP 07 84 3914 dated Jul. 23, 2010.

* cited by examiner

HYDRAULIC TRANSMISSION ASSEMBLY

CROSS REFERENCE TO RELATED APPLICATIONS

This application claims the priority benefit of U.S. application Ser. No. 11/539,299, filed Oct. 6, 2006, the disclosure of which is incorporated herein by reference.

BACKGROUND

Hydraulically-controlled transmission assemblies are an efficient way of controlling the speed and direction of land vehicles, such as walk behind and ride-on lawnmowers, ATV, and tractors.

Some known hydraulically-controlled transmission assemblies include high reduction mechanical gearing that can compromise the relative smoothness of the control of the vehicle. In addition, these transmission assemblies may be inherently limited in the amount of ground engaging power, and thus unable to put more than a limited amount of the engine's horsepower into ground engaging tasks. This affects control, accuracy and longevity of the transaxle as well as compromising the vehicle's performance and otherwise limiting the vehicles applications.

Another known hydraulically controlled transmission assembly includes a gerotor motor of the type having a spool valve that connects to a main output drive shaft. The output end of the main output drive shaft is disposed on one side of the rotor assembly and the spool valve and brake assembly are disposed on an opposite side of the gerotor assembly. Such a configuration requires complicated attachment of the spool valve to the main output drive shaft and a portion of the main output drive shaft orbits and rotates. Furthermore, the spool valve includes an extension to which brake disks are attached, thus requiring a larger housing assembly for the hydraulic device.

Other known hydraulically-controlled transmission assemblies, which include a hydraulic motor and a brake assembly, typically comprise large housings and/or complicated drive connections and/or complicated fluid paths. Still other known ground engaging transaxles are substantial in design and weight.

Piston-powered pumped units, while adaptable, have their own requirements and restrictions including the need for separate motors or the need of an associated gear transmission to apply power to the ground. While these known drive systems are functional, their compromise in cost and performance of each design is apparent.

BRIEF DESCRIPTION

In accordance with one aspect of the present disclosure, a hydraulic transmission assembly for a ground vehicle comprises a pump unit and a hydraulic motor assembly connected to the pump unit. The pump unit includes a driven shaft configured to operably connect to a motor of the ground vehicle. The hydraulic motor assembly includes a motor housing configured to rotatably mount to a wheel assembly of the ground vehicle. The housing has a central opening. A stationary output shaft has a first end section received in the central opening and a second end section configured to rigidly attach to a frame of the ground vehicle. The output shaft includes at least one internal fluid passage in fluid communication with at least one fluid passage of the pump unit. Pressurization of the hydraulic motor assembly via the pump unit rotates the motor housing relative to the stationary output shaft which, in turn, rotates the wheel assembly in one of a first direction and second direction.

In accordance with another aspect of the present invention, a hydraulic motor assembly for use in a hydraulic transmission assembly comprises a stationary output shaft and a motor housing at least partially surrounding the output shaft. A rotor assembly is mounted to the motor housing. The motor housing is rotatable about the stationary output shaft.

In accordance with yet another aspect of the present invention, a hydraulic transmission assembly comprises a rotatable housing and a fixed output shaft at least partially disposed in the housing and at least partially extending axially from the housing. The output shaft includes first and second independently pressurizable fluid passages. A gerotor assembly cooperates with the output shaft and is in communication with the first and second fluid passages. A pressure released brake assembly cooperates with the output shaft and the housing. Pressurization of the first fluid passage rotates the housing in a first direction. Pressurization of the second fluid passage rotates the housing in a second direction. Pressurization of either of the first fluid passage or the second fluid passage results in the pressure released brake assembly operating in a disengaged position which allows for rotation of the housing relative to the fixed output shaft in one of the first and second directions.

In accordance with still yet another aspect of the present invention, a hydraulic motor assembly comprises an output shaft including at least two fluid passages. Each fluid passage is selectively and independently pressurizable relative to the other. A motor housing at least partially surrounds the output shaft. A rotor assembly is operably connected to the motor housing.

DETAILED DESCRIPTION

Figure 1:
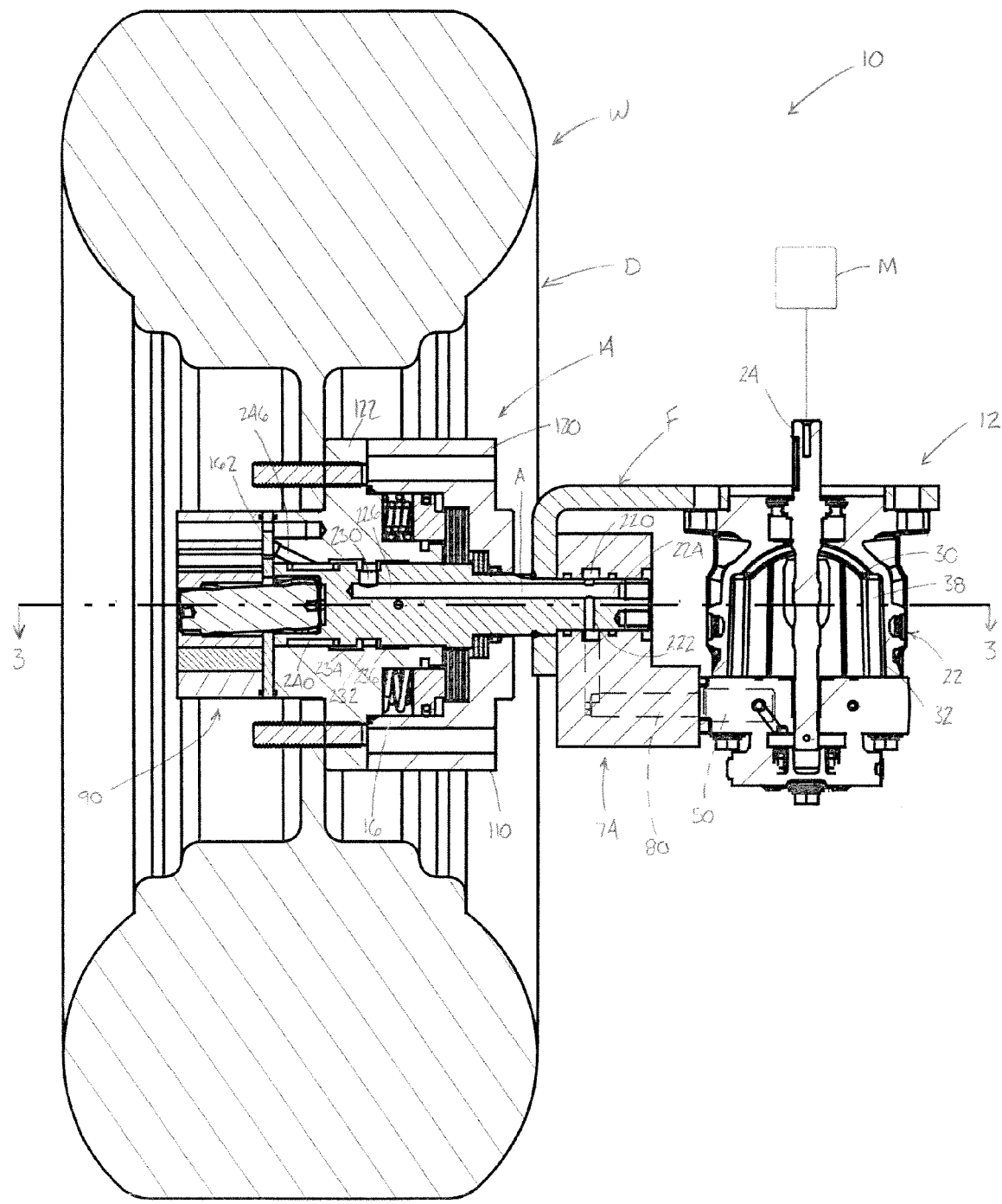
FIG. 1 is a partial cross-sectional view of a hydraulic transmission assembly.

It should, of course, be understood that the description and drawings herein are merely illustrative and that various modifications and changes can be made in the structures disclosed without departing from the scope and spirit of the invention. It will also be appreciated that the various identified components of a hydraulic transmission assembly disclosed herein are merely terms of art that may vary from one manufacturer to another and should not be deemed to limit the present invention. All references to direction and position, unless otherwise indicated, refer to the orientation of the hydraulic transmission assembly illustrated in the drawings.

Referring now to the drawings, wherein like numerals refer to like parts throughout the several views, FIGS. 1-4 illustrate partial cross-sectional views of the hydraulic transmission assembly 10 in accordance with one aspect of the present invention. The hydraulic transmission assembly 10 for a ground vehicle, for example a riding zero-turn mower, a walk-behind commercial lawn mower, garden tractor, an all-terrain vehicle, or a small self-contained tracked backhoe, uses a combination of components to provide a reliable, smooth, easy to control, high-torque power delivery package. Power input, control, and power delivery are apparent to the user. The hydraulic transmission assembly 10 generally includes a pump unit 12, a hydraulic motor assembly 14 and a brake assembly 16.

The pump unit 12, which in the depicted embodiment is a variable displacement pump unit, includes a pump housing 22 and a driven shaft 24 that is driven by a motor M (FIG. 1, depicted schematically) that is external to the hydraulic transmission assembly 10. The motor M can be the motor that drives the vehicle as well as other components of the vehicle, for example mower blades, and the like. The motor M can operatively drive the driven shaft 24 through a transmission (not shown).

Figure 2:
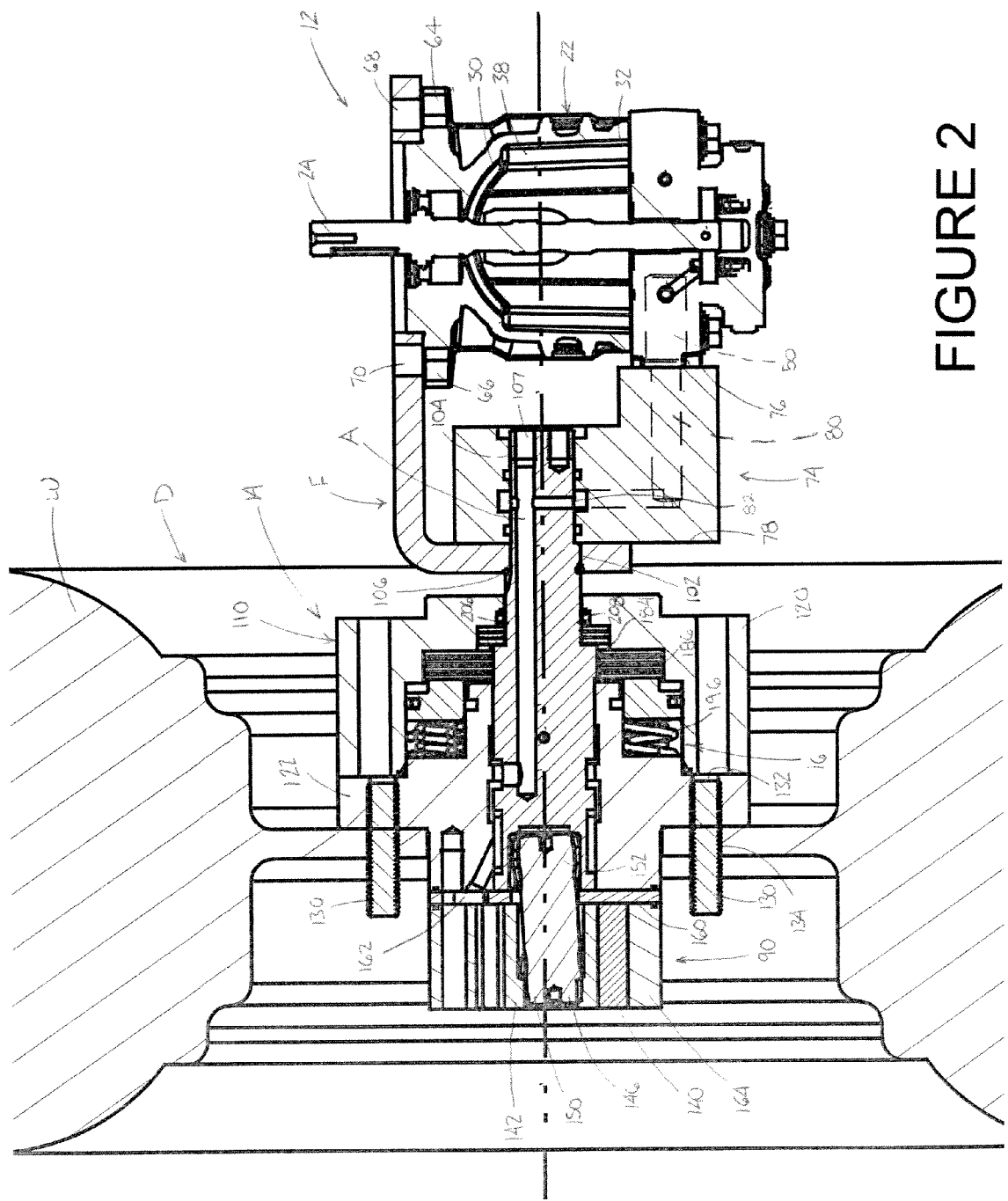
FIG. 2 is a partial enlarged view of the hydraulic transmission assembly of FIG. 1.

As best illustrated in FIGS. 1 and 2, a rotatable cylinder block 30 connects to the driven shaft 24 so that the block 30 rotates with the shaft. The rotatable cylinder block includes a plurality of chambers 32 that receive spring loaded pistons 38. A swash plate (not shown) contacts the pistons 38 to vary the pump chamber volume in each chamber 32. The swash plate pivots about the rotational axis of the driven shaft 24. Upper and lower bearings can support the driven shaft. Angular adjustment of the swash plate can be controlled by a control member (not shown). The operator of the ground vehicle can alter the volumetric output of each individual pump by manipulating the control member in a manner that is known in the art.

Figure 3:
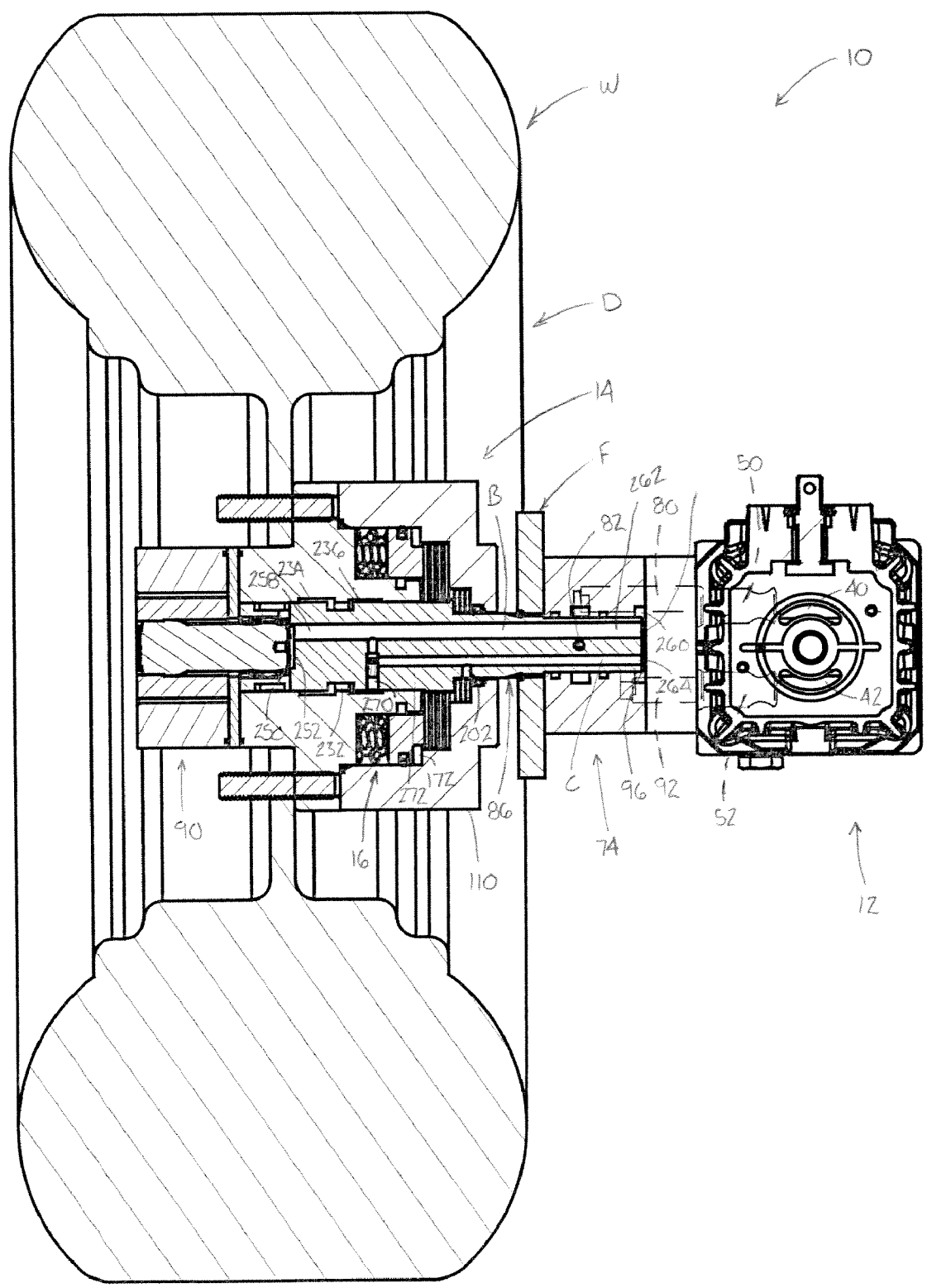
FIG. 3 is a cross-sectional view of the hydraulic transmission assembly of FIG. 1, the cross section being taken generally along lines 3-3.
Figure 4:
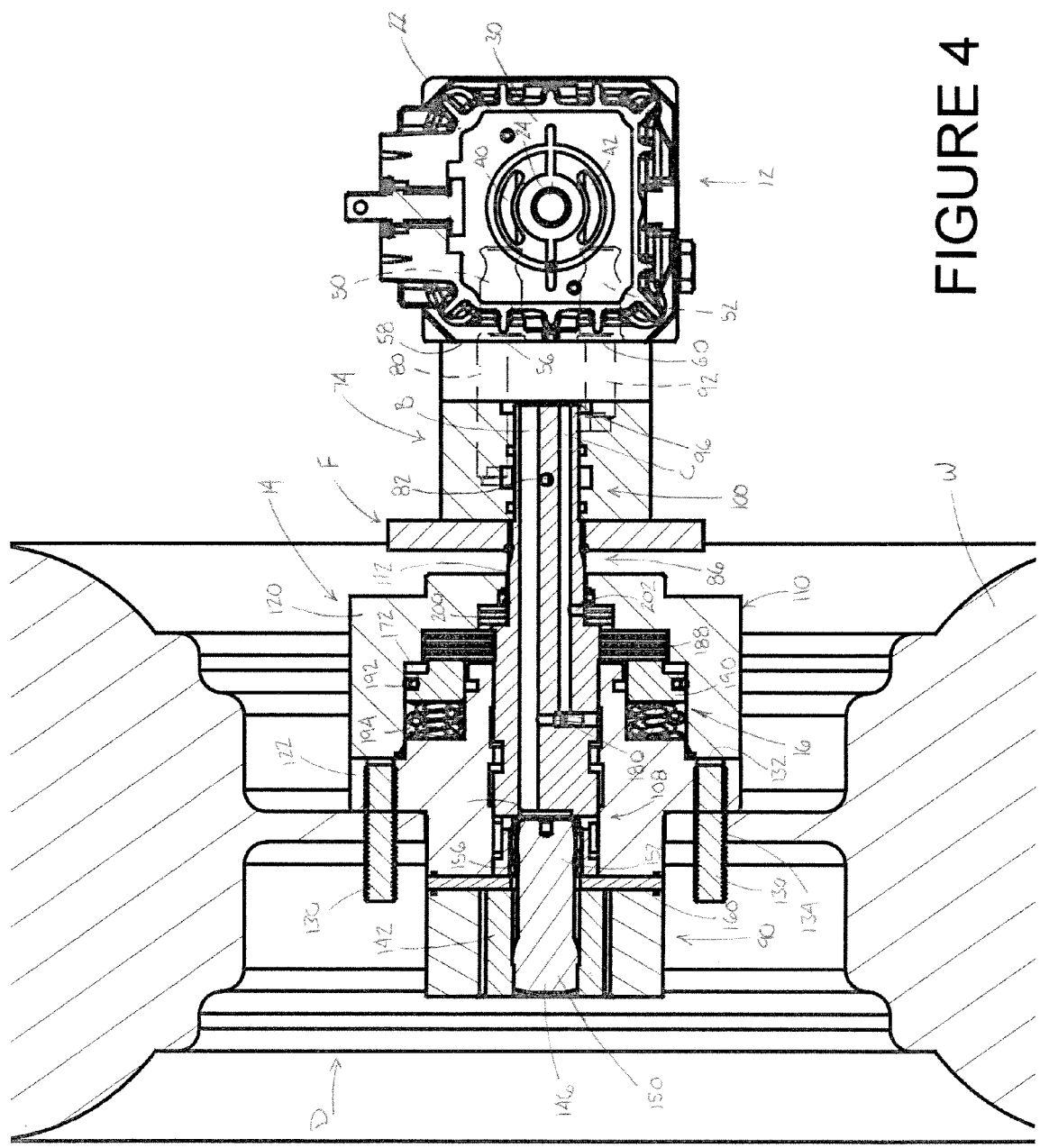
FIG. 4 is a partial enlarged view of the hydraulic transmission assembly of FIG. 3.

As more clearly seen in FIGS. 3 and 4, the pump housing 22 includes a plurality of passes and openings. First and second curved openings 40 and 42 respectively communicate with the chambers 32 of the cylinder block 30 to provide input and output ports for the pump unit 12 depending on the direction of rotation of the driven shaft 24. The first curved opening 40 communicates with a first linear passage 50 (shown in phantom) that communicates with the hydraulic motor assembly 14 in a manner that will be described in more detail below. The second curved opening 42 communicates with a second linear passage 52 (shown in phantom) that communicates with the hydraulic motor assembly 14 in a manner that will be described in more detail below. A first opening 56 is formed in a first planar surface 58 of the housing 22 where the first linear passage terminates. A second opening 60 is also formed in the first planar surface of the housing and communicates with the second linear passage 52.

With reference back to FIGS. 1 and 2, the pump unit 12 can be connected to a frame F of the ground vehicle via conventional manners. In the depicted embodiment, first and second bolt openings 64 and 66, respectively, formed in the housing 22, are in registry with first and second bolt openings 68 and 70, respectively, formed in the frame. The corresponding bolt openings allow the pump unit 12 to attach to the frame.

With particular reference to FIGS. 3 and 4, the pump unit 12 is further connected to a manifold 74. The manifold includes a planar first surface 76 that contacts the first planar surface 58 of the pump unit housing 22 when the hydraulic transmission assembly 10 is finally assembled. The planar surfaces can take other complementary configurations. The manifold 74 also includes a second planar surface 78 opposite the first planar surface. The second planar surface can attach to the frame F via conventional manners. A first passage 80 (shown in phantom) communicates with first linear passage 50 of the pump unit 12. The first passage 80 extends from the first planar surface 78 through the manifold to a first port 82 of an output shaft 86 of the hydraulic motor assembly 14. The first passage 80 is in fluid communication with a rotor assembly 90 attached to the hydraulic motor assembly via a first axially aligned output shaft passage A in a manner that will be described in more detail below.

The manifold 74 also includes a second passage 92 (shown in phantom in FIGS. 3 and 4) that contacts the first planar surface 58 of the pump unit housing 22 when the hydraulic transmission assembly 10 is assembled. The second passage 92 communicates with the second linear passage 52 of the pump unit 12. The second passage 92 extends from the first planar surface 78 through the manifold to a second port 96 of the output shaft 86 of the hydraulic motor assembly 14. The second passage 92 is also in fluid communication with the rotor assembly 90 via a second axially aligned output shaft passage B in a manner that will be described in more detail below.

Conventionally, an output shaft of a hydraulic motor assembly is rotatably configured to drive a wheel of a ground vehicle. In the depicted embodiment of FIGS. 1-4, the output shaft 86 is generally fixed to the frame F of the ground vehicle. A first end portion 100 of the output shaft extends through an opening 102 in the frame F and is received in an opening 104 of the manifold 74. The first end portion can be secured to the frame via conventional manners, such as a snap ring 106 (FIG. 2), and can be connected to the manifold via bolt openings 107 (FIG. 2) formed in the A first end portion 100, which align with bolt openings (not shown) formed in the manifold. A second end portion 108 of the output shaft 86 extends through an opening 112 (FIG. 4) located in a motor housing 110 of the hydraulic motor assembly 14 and is coupled to the rotor assembly 90.

The motor housing 110 includes a front housing section 120 and a rear housing section 122. The housing sections attach to one another via bolts (not shown) received in bolt holes (not shown) formed in the housing sections. The rear housing section 122 is attached to a drum (or hub) D of a wheel W of the ground vehicle via bolts 130 received in bolt holes 132 and 134 formed in the respective second housing section and the drum. As will be described in greater detail below, the motor housing is configured to rotate relative to the fixed output shaft 86 as one of the first and second axially aligned fluid passages A and B is pressurized. This, in turn, drives the wheel of the ground vehicle in a forward or reverse direction depending on which passage is pressurized.

With particular reference to FIGS. 2 and 4, the rotor assembly 90, which is similar to a known gerotor assembly, includes a stator 140 (which can also include rollers) and a rotor 142. The rotor includes a plurality of teeth that cooperate with the stator in a known manner to define expanding fluid pockets and contracting fluid pockets as the rotor rotates and orbits relative to the stator when hydraulic fluid is directed toward the expanding pockets.

A wobble stick 146, also referred to as a drive link or a wobble shaft, connects to the rotor 142 at a first end 150. The wobble stick can attach to the rotor via a splined connection, which is known in the art. The first end 150 of the wobble stick 146 rotates and orbits relative to the stator 140 as the rotor 142 rotates and orbits relative to the stator. A second end 152 of the wobble shaft is received in the output shaft 86. Particularly, the output shaft 86 includes a central opening 156 for receiving the second end of the wobble stick.

A wear plate 160 is sandwiched between the rear housing section 122 and the rotor assembly 90. The wear plate includes a plurality of openings 162 radially spaced from the rotational axis of the motor housing 110. The openings 162 in the wear plate 50 communicate with the pockets (either expanding or contracting) formed in the rotor assembly 90 in a manner that is known in the art. Accordingly, the number of openings 162 generally equals the number of pockets.

The rotor assembly 90 is rotatably connected to the motor housing 110 to impart rotation to the motor housing and, in turn, the wheel. Particularly, rotation of the motor housing 110 about a rotational axis is caused by delivering pressurized fluid to the expanding cells of the rotor assembly 90. In the depicted embodiment, a rotor housing 164 (FIG. 2) is attached to the rear housing section 122 via conventional manners, such as bolts which can extend through aligned openings located in the rotor housing, wear plate and rear housing section. An end plate (not shown) can attach to the rotor assembly 90 on an opposite side of the rotor assembly as the wear plate 160.

The hydraulic transmission assembly 10 further includes the brake assembly 16 that can inhibit the motor housing 110 from rotating when the hydraulic motor assembly 14 is in an unpressurized condition.

With reference back to FIG. 4, pressurized fluid travels through a third passageway C, which will be described in more detail below, to pressurize a brake chamber 172 that is at least partially defined in the motor housing 110. In the depicted embodiment, passageway C is axially aligned with first and second passageways A and B. No matter which port, either first port 82 or second port 96, serves as an inlet for the hydraulic motor assembly 14, the brake chamber 100 is pressurized via the third passageway C. This is due, at least in part, to a shuttle valve 180.

The brake assembly 16 for the hydraulic transmission assembly will be described in more detail. With reference to FIGS. 2 and 4, the output shaft 40 includes a splined portion 184 that receives friction disks 186 that are appropriately shaped so that the friction disks rotate along with the motor housing 110. Disk stampings 188 attach to the front housing section 120 in a known manner so that the disk stampings do not rotate with respect to the motor housing 110. The brake package, i.e., the friction disks and the disk stampings, are disposed forwardly of the rotor assembly 90.

In the depicted embodiment, a piston 190 contacts one of the friction disks 186. Alternatively, the piston 190 can contact one of the disk stampings 188 if the orientation was slightly changed. A seal 192 contacts the piston and the front housing section 120 thus separating the brake chamber 172 from a cavity 194 that receives a biasing member, for example a spring 196, that urges the piston 190 towards the friction disk. When the brake chamber is unpressurized the spring urges the piston towards the friction disk and the friction disks contact the disk stampings thereby inhibiting the rotation of the motor housing 110.

A thrust bearing assembly 200, which in the depicted embodiment includes two washers having a thrust bearing sandwiched between them, surrounds the output shaft 86 at a location that is aligned with a radial passage 202 of the output shaft. A seal retainer 206 that retains a dynamic seal 208 fits around the output shaft outside of the thrust bearing assembly 200. A dust cover (not shown) can be fitted around the output shaft to protect the seal and other internal components. The seal 208 cooperates with the front housing section 120, the seal retainer 206 and the output shaft 86 to define a boundary of the brake chamber 172.

Pressurized fluid passes through the thrust bearing assembly 200, which can act as a sort of miniature pump, to pressurize the brake chamber 172. When pressurized, the fluid acts on the piston 190 urging it away from the friction disks 186. The hydraulic transmission assembly 10 can be a "bearingless" device in that the depicted embodiment does not include bearings, other than the thrust bearing assembly. In a bearingless hydraulic device, the output shaft can include a knurled surface.

With reference to FIGS. 1 and 3, the operation of the hydraulic transmission assembly will now de described. In this example, rotation of the driven shaft 24 of the pump unit 12 in a first direction pressurizes the first axially aligned passage A. This, in turn, rotates the motor housing 110, which rotates the drum D and wheel W of the ground vehicle in a first or forward direction. Particularly, the pump unit 12 delivers pressurized fluid through the curved opening 40 and the first linear passage 50 of the pump unit, through the first passage 80 of the manifold 74 and into a first annular groove 220 formed in the manifold. The first annular groove communicates directly with the first port 82 of the output shaft 86. The pressurized fluid flows into the first port and through a first radially aligned passage 222, which is in fluid communication with a first end section 224 of the first axially aligned passage A. Fluid flows through the first axially aligned passage toward the rotor assembly 90. A second end section 226 of the first axially aligned passage A is in fluid communication with a second radially aligned passage 230, which directs the pressurized fluid to a second annular groove 232 formed in the rear housing section 122 of the motor housing 110.

A first predetermined volume of the fluid flows from the second annular groove into a first annular slot 234, which extends toward the rotor housing 90. A second predetermined volume of the fluid flows into a second annular slot 236, which extends toward the pump unit 12. The first and second annular slots are formed in the rear housing section 122. The first annular slot 234 selectively communicates with axial slots 240 formed in the output shaft 86. Generally axially aligned passages 246 (one shown in FIG. 1) extend between the axial slots and the appropriate openings 162 in the wear plate 160.

Fluid enters the pockets in the rotor assembly 90 via the openings 162 in the wear plate 160 on one side of a line of eccentricity and exits the rotor assembly via openings 162 in the wear plate 160 on the opposite side of the line of eccentricity. As pressurized fluid flows into the rotor assembly via the openings 162, the pressurized fluid is delivered to the expanding cells of the rotor assembly, which causes the rotor assembly to rotate in the first direction. As indicated previously, the rotor assembly 90 is connected to the motor housing 110, which is attached to the drum of the wheel, and the output shaft 86 is fixed to the vehicle frame F. Thus, as the rotor assembly rotates in the first direction, the motor assembly and, in turn, the wheel, rotate in the first direction.

A second annular slot 250 formed in the output shaft 86 receives the flow of fluid exiting the rotor assembly 90. A second radially aligned passage 252 also formed in the output shaft 86, which is in communication with the second annular slot 250, directs the fluid into a second end section 258 of the second axially aligned passage B. Fluid flows through the second axially aligned passage B toward the pump unit 12. The fluid can then directed back into the pump unit via a second annular groove 260 formed in the manifold, which is in communication with a first end section 262 of the second axially aligned passage B, a first end section 264 of the third axially aligned passage C and the second manifold passage 92. Alternatively, the fluid can be directed into a fluid tank (not shown) which communicates with the pump unit.

As indicated before, the second predetermined volume of the fluid flows from the second annular groove 232 into the second annular slot 236. This pressurized fluid flows into a third radially aligned passage 270 formed in the output shaft 86. The third radially aligned passage communicates with both the second end section 258 of the second axially aligned passage B and a first end section 272 of the third axially aligned passage C. Operably located in the third radially aligned passage 270 is the shuttle valve 180; although, it should be appreciated that other types of valves are also contemplated. As the pressurized flows through the third radially aligned passage 270 to the third axially aligned passage C, the pressurized fluid moves the shuttle valve to a first location, which precludes fluid from passing from the third radially aligned passage 270 into the second axially aligned passage B. The pressurized fluid is directed into the third axially aligned passage C and is at least partially delivered to the brake chamber 172, thus disengaging the brake assembly 16. Fluid travels into the radial passage 202, through the thrust bearing assembly 200, which can act as a sort of miniature pump, to pressurize the brake chamber 172. When pressurized, the fluid acts on the piston 190 urging it away from the friction disks 186. The remainder of this pressurized fluid flows through the third axially aligned passage C and back into one of the pump unit and fluid tank via the second annular groove 260.

With continued reference to FIGS. 1 and 3, pressurization of the second axially aligned passage B rotates the motor housing 110 and, in turn the drum D and wheel W of the ground vehicle, in a second or reverse direction.

Particularly, the pump unit 12 delivers pressurized fluid through the curved opening 42 the second linear passage 52 of the pump unit, through the second passage 92 of the manifold 74 and into the second annular groove 260 formed in the manifold. The second annular groove communicates directly with the second port 96 of the output shaft 86. The pressurized fluid flows through the second port and at least partially into both of the first end sections 262 and 264 of the second and third axially aligned passages B and C, respectively.

Pressurized fluid flowing through the second axially aligned passage B is directed towards the rotor assembly 90. At least a portion of the pressurized flowing through the third axially aligned passage C, which is also in communication with the second annular groove 260, is delivered to the brake chamber 172, thus disengaging the brake assembly, as described above. The remainder of the pressurized fluid flows towards the third radially aligned passage 270. As the pressurized flows into the third radially aligned passage 270, the pressurized fluid moves the shuttle valve 180 to a second location, which precludes fluid from passing from the third radially aligned passage 270 into the second annular slot 236. In this regard, the fluid is directed into the second axially aligned passage B.

Fluid flows through the second axially aligned passage, the second radially aligned passage 252, the second annular slot 250 and enters the pockets in the rotor assembly 90 via the openings 162 in the wear plate 160 on one side of a line of eccentricity. As pressurized fluid flows into the rotor assembly via the openings 162, the pressurized fluid is delivered to the expanding cells of the rotor assembly, which causes the rotor assembly to rotate in the second direction, which, in turn, rotates the motor assembly and the wheel in the second direction. Fluid exits the rotor assembly via openings 162 in the wear plate 160 on the opposite side of the line of eccentricity.

Fluid travels through the axially aligned passages 246, the first annular slot 234, the second annular groove 232, and into the first axially aligned passage A. Although some fluid may flow into the second annular slot 236 and third radially aligned passage 270, that fluid flow is stopped by the shuttle valve 180. Fluid flows through the first axially aligned passage A toward the pump unit 12. The fluid can then be directed back into the pump unit via the first annular groove 220 and the first manifold passage 82. Alternatively, the fluid can be directed into the fluid tank.

It should be appreciated that the rotational axis of the motor housing 110 is at least generally perpendicular to the rotational axis of the driven shaft 24 of the pump unit 12. Such a configuration allows for a vertical drive shaft of the motor M, which is almost universally preferred for mowers.

Figure 5:
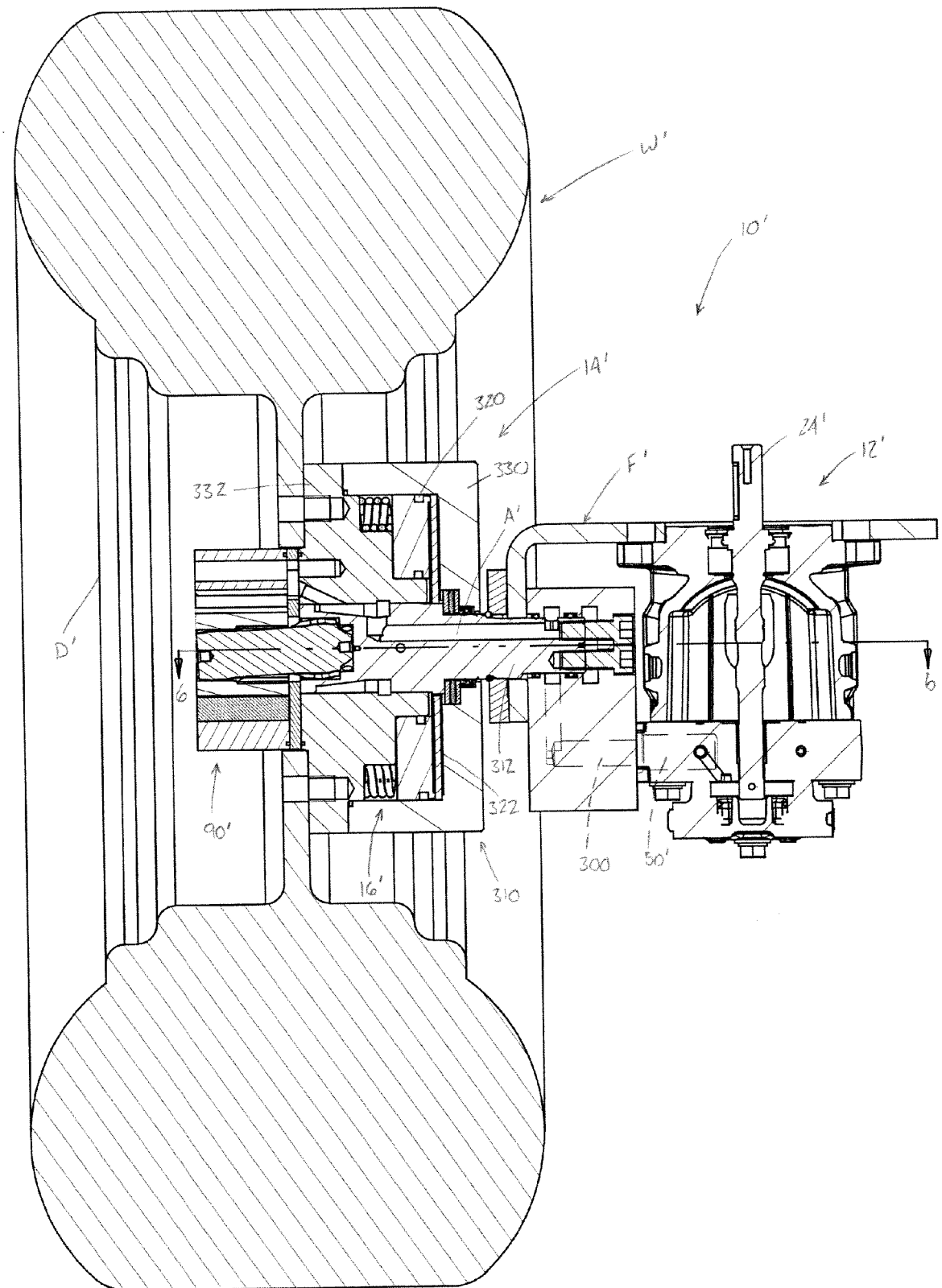
FIG. 5 is a partial cross-sectional view of a hydraulic transmission assembly in accordance with another aspect of the present invention.
Figure 6:
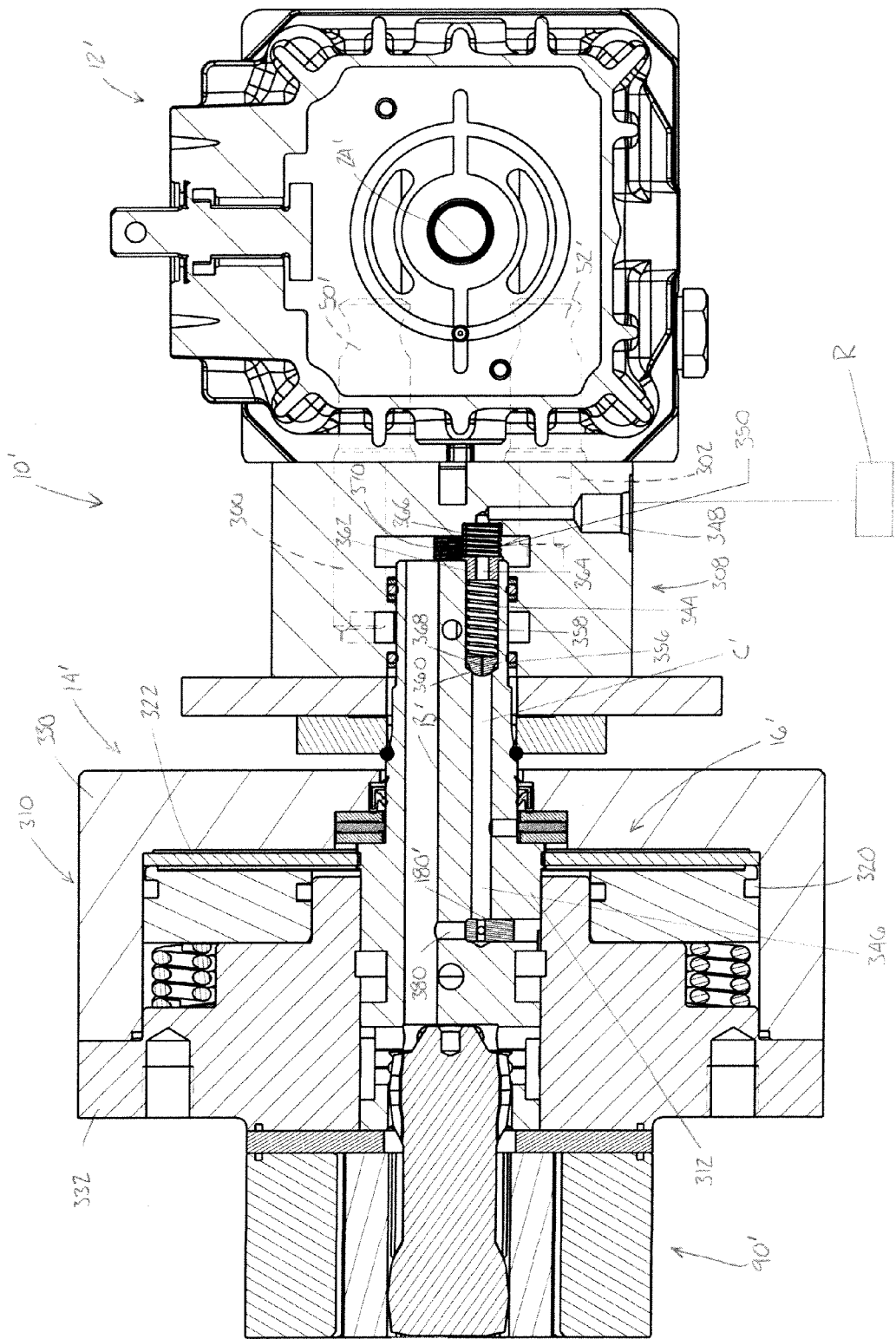
FIG. 6 is an enlarged partial cross-sectional view of the hydraulic transmission assembly of FIG. 5, the cross section being taken generally along lines 6-6.
Figure 7:
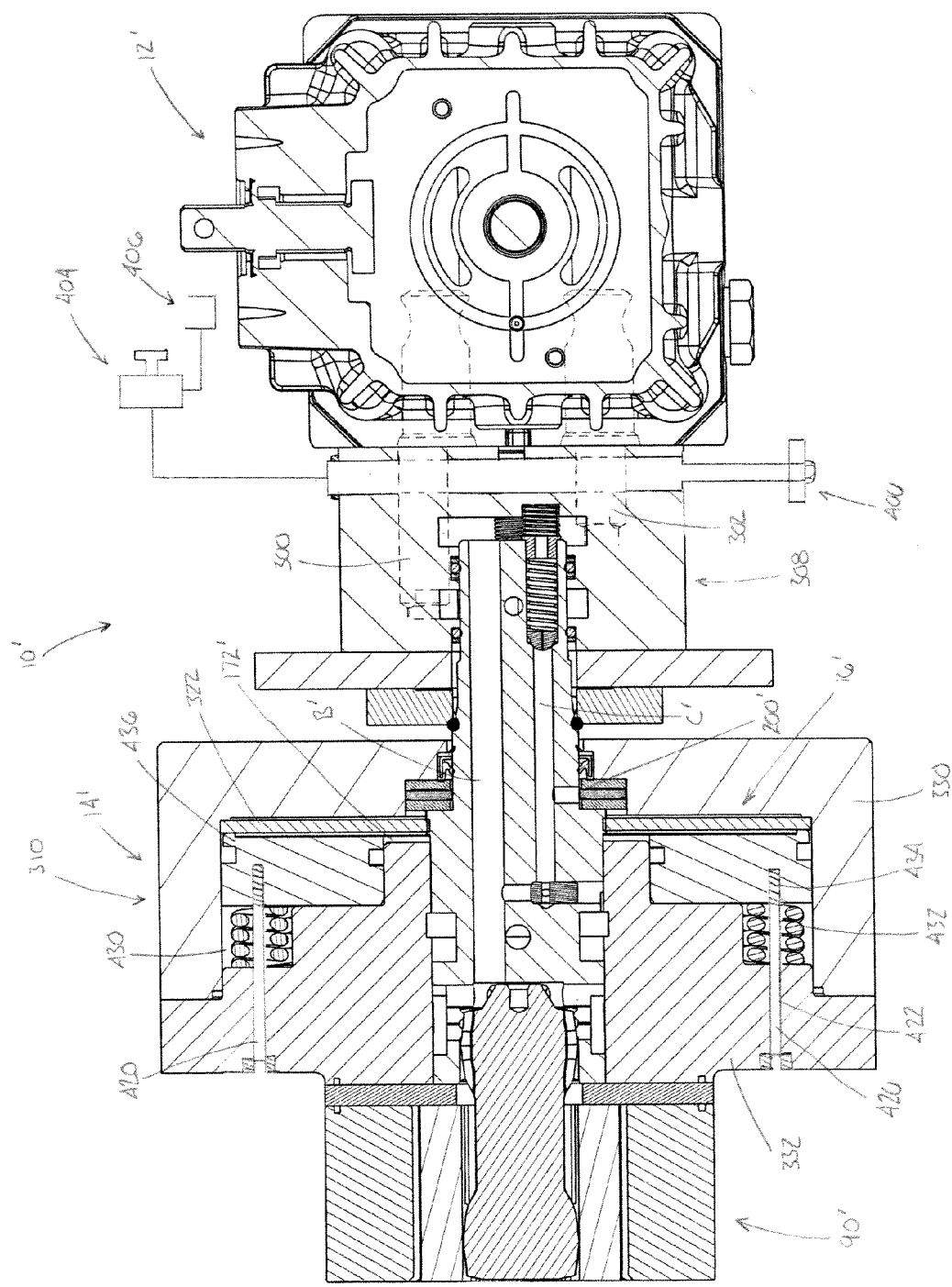
FIG. 7 is an enlarged partial cross-sectional view of the hydraulic transmission assembly of FIG. 5.

An alternate embodiment of a hydraulic transmission assembly is shown in FIGS. 5-7. Since most of the structure and function is substantially identical, reference numerals with a single primed suffix (') refer to like components (e.g., hydraulic transmission assembly is referred to by reference numeral 10'), and new numerals identify new components in the additional embodiment of FIGS. 5 and 6.

Similar to the previous embodiment, the hydraulic transmission assembly 10' generally includes a pump unit 12' connected to a hydraulic motor assembly 14' and a brake assembly 16'. The hydraulic transmission assembly can be connected to a frame F' of the ground vehicle via conventional manners. The pump unit includes first and second linear passages 50' and 52', respectively, in fluid communication with first and second passages 300 and 302, respectively, formed in a manifold 308.

The hydraulic motor assembly 14' comprises a rotatable motor housing 310, a stationary output shaft 312 and a rotor assembly 90' rotatably coupled to the motor housing. The output shaft can be fixed to the frame F' and the manifold 308 The output shaft includes first, second and third axially aligned passages (the first passage A' is shown in FIG. 5 and the second and third passages B' and C', respectively, are shown in FIG. 6). The motor housing is configured to rotate relative to the fixed output shaft 312 as one of the first and second axially aligned fluid passages A' and B' is pressurized via the pump unit 12'. The third axially aligned passage C' directs fluid to the brake assembly 16' to pressurize a brake chamber 320 and release a single brake plate 322. No matter which axially aligned fluid passage is pressurized, either the first or the second, the brake chamber 320 is pressurized. This is due, at least in part, to a shuttle valve 180' which allows selective communication between the pressurized first or second axially aligned fluid passage and the third axially aligned passage.

The motor housing includes a front housing section 330 and a rear housing section 332. The housing sections can attach to one another via conventional manners. The rear housing section 332 is attached to a drum D' of a wheel W' of a ground vehicle via conventional manners. The motor housing is configured to rotate relative to the fixed output shaft 312 as one of the first and second axially aligned fluid passages is pressurized. This, in turn, drives the wheel of the ground vehicle in a forward or reverse direction.

The third passage C' includes a first end section 344 having a first dimension and a second end section 346 having a second smaller dimension. The first end section is in fluid communication with a fluid tank (not shown) via a tank dump 348 formed in the manifold 308. The second end section is in fluid communication with one of the first and second axially aligned passages via the shuttle valve 180'. Located in the enlarged first end section 344 is a relief valve 350.

The relief valve generally includes a stopper 356, a spring 358 for biasing the stopper against an opening 360, a body 362 including a passage 364 in communication with the tank dump 348 and a hollow threaded portion 364. The stopper 356 includes a through hole 368 which allows fluid to flow to the tank dump and/or a heat exchanger or radiator R (schematically depicted in FIG. 6). Passing fluid through the heat exchanger allows dissipation of heat which is generally desirable for hydraulic systems of this type and provides for a stable hydraulic system. The hole diameter is typically dependent upon the type of vehicle. Generally, the hole 368 has a diameter of approximately 0.003 inches to approximately 0.015 inches.

The spring 358 is compressed between the stopper and the body. The threaded portion can have external threads that engage internal thread 370 formed in a portion of the manifold 308 for securing the relief valve in the first end section. Alternatively, the relief valve 350 can secured in the third passage C' in other manners, such as a press in fit. In such instance, the relief valve may not be threaded. The stopper includes a rounded contact surface adapted to prevent fluid flow from entering the first end section 344.

The relief valve protects the components of the hydraulic transmission assembly 10' from a pressure surge. For example, rotation of a driven shaft 24' of the pump unit 12' in a first direction pressurizes the first axially aligned passage A'. In this regard, the second axially aligned passage B' acts as a fluid return passage. If the motor housing 310 suddenly stops rotation, e.g. from suddenly contacting an obstruction, while pressure fluid is being delivered to the first axially aligned passage, the hydraulic transmission assembly would experience a pressure spike. As the pressure in the second end section 346 of the third passage C' exceeds the biasing force of the spring 358, which can be set at a number of different pressures, the spring 358 will compress. This will move the stopper 356 away from the opening 360 allowing fluid to flow into the first end section 344, around the spring and into passage 364. The fluid is then delivered into the tank dump 348 and/or radiator R which reduces the pressure in the hydraulic transmission assembly. Once the pressure in the second end section 364 returns below the biasing force of the spring, the spring will move the stopper back against the opening 360.

Similar to the first embodiment, rotation of the driven shaft 24' of the pump unit 12' in a first direction pressurizes the first axially aligned passage A'. This, in turn, rotates the motor housing 310 in a first direction, which rotates the wheel assembly of the ground vehicle in a first or forward direction. Rotation of the driven shaft 24' of the pump unit 12' in a second direction pressurizes the second axially aligned passage B'. This, in turn, rotates the motor housing 310 in a second direction, which rotates the wheel assembly of the ground vehicle in a second or reverse direction. However, unlike the first embodiment, pressurized fluid is delivered to the third axially aligned passage C' via a radially aligned passage 380. As the pressurized flows into the radially aligned passage 380, the pressurized fluid moves the shuttle valve 180', which precludes fluid from passing from the radially aligned passage into the first axially aligned passage.

With reference to FIG. 7, alternate manners of disengaging or releasing the brake assembly 16' during a static condition of the hydraulic transmission assembly 10' is illustrated.

In a first manner, a shut-off valve 400, which is coupled to the manifold 308, is in selective communication with the first and second passages 300 and 302, respectively, formed in the manifold. In use, the shut-off valve prevents flow of fluid to the pump unit 12' thereby maintaining fluid in the axially aligned passages. To release the brake assembly, an external pump 404, which is in communication with a fluid reservoir 406, is connected to the shut-off valve. The external pump pressurizes the fluid in one of the first and second axially aligned passages A' and B', respectively, which pressurizes the fluid in the third axially aligned passage C'. At least a portion of the pressurized fluid is directed through the thrust bearing assembly 200' to pressurize the brake chamber 172', as described above. As the brake chamber is pressurized, the brake assembly is released which allows the motor housing 310 to rotate relative to the stationary output shaft 312.

In a second manner, bolts 420 can extend through bolt holes 422 located in the rear housing section 332 through a cavity 430 that receives a biasing member, for example a spring 432. A threaded portion of each bolt threadingly engages an aperture 434 located in a piston 436. Similar to the first embodiment, the spring urges the piston 436 towards the single brake plate 322. When the brake chamber is unpressurized, the spring urges the piston towards the brake plate which contact the front housing section 330 thereby inhibiting the rotation of the motor housing 310. To disengage the brake assembly, the bolts are rotated, which, in turn, moves the piston towards the rear housing section. As the piston moves, the spring compresses thereby releasing the single brake plate 322 and allowing the motor housing to rotate.

As to a further discussion of the manner of operation of the alternate embodiment of the hydraulic transmission assembly 10', same should be apparent from the above description relative to the first embodiment. Accordingly, no further discussion will be provided.

The above disclosed hydraulic transmission assembly provides all or nearly all of the fluid passages for the transmission assembly inside robust housings. This differs from transmission assemblies that include intervening hoses between the pump unit and the hydraulic motor assembly. As discussed above, fluid communication between the pump unit and the hydraulic motor assembly is provided by internal fluid passages having no intervening hoses. Such a configuration reduces fluid leakage and provides a more efficient delivery of fluid. The assembly is provided in a manner so that components of the assembly can be easily interchanged. For example, many different hydraulic motor assemblies can attach to the pump unit. All of the components of the hydraulic transmission assembly can be mounted to one another and therefore mounted as one unit to the ground vehicle. Such a configuration enhances the structural and rotational integrity of the power input and also simplifies the remainder of the ground vehicle to which the transmission is to be mounted. Attaching the motor housing to the drum of the wheel, as opposed to the output shaft being attached to the drum, utilizes space in the vehicle that was once not utilized. Accordingly, the hydraulic transmission assembly can be used with vehicles that were once thought too small to incorporate such a hydraulic transmission.

The present disclosure has been described with reference to several embodiments. Obviously, modifications and alterations will occur to others upon reading and understanding the preceding detailed description. For example, it should be appreciated that one-way check valves, which are in selective communication with the first and second axially aligned passages, can be implemented in lieu of the third axially aligned passage to pressurized the brake chamber. It is intended that the disclosures be construed as including all such modifications and alterations insofar as they come within the scope of the claims appended hereto, as well as their equivalents.

Having thus described the invention, it is now claimed:

1. A hydraulic transmission assembly for an associated ground vehicle comprising:
   a pump unit configured to operably connect to an associated motor of the associated ground vehicle;
   a manifold fluidly connected to said pump unit, the manifold including means for mounting to the associated ground vehicle; and
   a hydraulic motor assembly connected to said manifold, said motor assembly including:
      a motor housing configured to rotatably mount to an associated wheel assembly of the associated ground vehicle,
      a stationary output shaft having a first end section received in said motor housing and a second end section configured to rigidly attach to an associated frame of the associated ground vehicle, said output shaft including at least one internal fluid passage in fluid communication with at least one fluid passage of said pump unit, said output shaft further including another internal fluid passage communicating with a pressurizable brake assembly at least partially housed in said hydraulic motor assembly, pressurization of said another internal fluid passage disengaging said brake assembly,
   wherein pressurization of said hydraulic motor assembly via said pump unit rotates said motor housing relative to said stationary output shaft which, in turn, rotates the associated wheel assembly in one of a first direction and second direction,
   wherein said manifold is fluidly connected to said at least one passage of said pump unit and said at least one passage of said output shaft via at least one internal passage, wherein said manifold fluidly connects said pump unit and said hydraulic motor assembly with no intervening external fluid lines.

2. The hydraulic transmission assembly of claim 1, wherein said output shaft includes a first defined fluid passage and a second defined fluid passage, each of said first and second defined fluid passage being in fluid communication with said at least one fluid passage of said pump unit, wherein pressurization of said first defined fluid passage rotates said motor housing in said first direction, wherein pressurization of said second defined fluid passage rotates said motor housing in said second direction.

3. The hydraulic transmission assembly of claim 2, wherein said output shaft includes a third defined fluid passage in selective fluid communication with one of said first and second defined fluid passages, said third defined fluid passage communicating with said pressurizable brake assembly.

4. The hydraulic transmission assembly of claim 3, further including a valve member, said valve member allowing selective communication between either of said first defined fluid passage or said second defined fluid passage, when either of said first or second passages are pressurized, and said third defined fluid passage.

5. The hydraulic transmission assembly of claim 1, further comprising a rotor assembly fixedly mounted to said motor housing, said rotor assembly including at least one fluid passage in communication with said at least one internal fluid passage of said output shaft.

6. The hydraulic transmission assembly of claim 4, further including a second valve member, said second valve member operably coupled to said third defined fluid passage, said second valve member configured to direct pressurized fluid out of said hydraulic motor assembly in response to a pressure surge.

7. The hydraulic transmission assembly of claim 1, wherein said motor housing includes a first housing section mounted to a second housing section, said first and second housing sections defining a pressurizable brake chamber for housing said pressurizable brake assembly.

8. The hydraulic transmission assembly of claim 7, wherein said third defined fluid passage is in communication with said pressurizable brake chamber.

9. The hydraulic transmission assembly of claim 1, further including a relief valve member for relieving a pressure build-up in said hydraulic transmission assembly, wherein said relief valve member includes a fluid leakage hole, said leakage hole allowing fluid to flow to at least one of a tank dump and a heat exchanger for dissipation of heat.

10. The hydraulic transmission assembly of claim 1, further comprising means for disengaging said brake assembly during a static condition of said hydraulic transmission assembly.

11. The hydraulic transmission assembly of claim 1, wherein said pressurizable brake assembly includes a first brake disk and a second brake disk, said first brake disk being connected to said output shaft and said second brake disk being connected to said motor housing.

12. The hydraulic transmission assembly of claim 11, further comprising:
   a piston disposed in said motor housing adjacent at least one of the first and second brake disks, the piston cooperating with said motor housing to at least partially define a brake pressure chamber of said pressurizable brake assembly, the motor housing and the first and second defined fluid passages being configured such that pressurization of either passage results in pressurization of said brake pressure chamber; and
   a biasing member disposed in said motor housing and contacting said piston, said biasing member urging said piston toward at least one of the first and second brake disks.

13. The hydraulic transmission assembly of claim 1, further comprising a rotor assembly cooperating with said output shaft, said rotor assembly being in communication with said first and second defined fluid passages, wherein said rotor assembly is a gerotor assembly including a rotor and a stator, and further comprising a drive link having a first end and a second end, said first end being connected to said rotor, said second end being connected to said output shaft, wherein said motor housing receives said gerotor assembly and said drive link.

14. A hydraulic transmission assembly for an associated ground vehicle comprising:
   a pump unit;
   a hydraulic motor assembly fluidly connected to said pump unit, said motor assembly including:
      a rotatable housing configured to connect a wheel assembly of the associated ground vehicle; and
      an output shaft at least partially disposed in said housing and configured to secure a frame of the associated ground vehicle, said output shaft including first and second independently pressurizable fluid passages in fluid communication with said pump unit;
   wherein pressurization of at least one of said first and second passages via said pump unit rotates said motor housing relative to said output shaft which, in turn, rotates the wheel assembly in one of a first direction and second direction;

a manifold fluidly connected to said pump unit and said first and second fluid passages of said output shaft, wherein said manifold fluidly connects said pump unit and said hydraulic motor assembly with no intervening external fluid lines;

a radiator fluidly connected to said hydraulic motor assembly; and a valve in the hydraulic motor assembly configured to allow fluid to flow to said radiator for dissipation of heat while maintaining pressure in at least one of the first and second passages.

15. The hydraulic transmission assembly of claim 14, wherein said motor housing at least partially defines a pressurizable brake chamber for at least partially housing a pressure released brake assembly, wherein said output shaft includes a third defined fluid passage in selective fluid communication with one of said first and second defined fluid passages, said third defined fluid passage communicating with said brake assembly.

16. The hydraulic transmission assembly of claim 15, wherein said valve is operably coupled to said third fluid passage.

17. The hydraulic transmission assembly of claim 16, wherein said valve includes:

a stopper including a through hole for allowing fluid to flow to said radiator, and a biasing member for biasing the stopper against an opening of said third fluid passage.

18. The hydraulic transmission assembly of claim 15, wherein said valve is disposed in said third passage.

19. The hydraulic transmission assembly of claim 15, wherein said pressure released brake assembly includes a first brake disk and a second brake disk, said first brake disk being connected to said output shaft and said second brake disk being connected to said housing.

20. The hydraulic transmission assembly of claim 19, further comprising:

a piston disposed in said housing adjacent at least one of the first and second brake disks, the piston cooperating with said housing to at least partially define said pressurizable brake chamber, the housing and the first and second fluid passages being configured such that pressurization of either passage results in pressurization of said brake chamber; and a biasing member disposed in said housing and contacting said piston, said biasing member urging said piston toward at least one of the first and second brake disks.

* * * * *